United States Patent
Wedemeier et al.

(10) Patent No.: US 11,338,553 B2
(45) Date of Patent: May 24, 2022

(54) COMPOSITE MATERIAL WITH IMPROVED SHAPING PROPERTIES AND METHOD FOR PRODUCING SUCH A COMPOSITE MATERIAL AND A SHAPED COMPONENT FROM IT

(71) Applicant: Salzgitter Flachstahl GmbH, Salzgitter (DE)

(72) Inventors: Andreas Wedemeier, Braunschweig (DE); Benjamin Poller, Hannover (DE)

(73) Assignee: Salzgitter Flachstahl GmbH, Salzgitter (DE)

( * ) Notice: Subject to any disclaimer, the term of this patent is extended or adjusted under 35 U.S.C. 154(b) by 525 days.

(21) Appl. No.: 16/326,546

(22) PCT Filed: Aug. 23, 2017

(86) PCT No.: PCT/EP2017/071213
§ 371 (c)(1),
(2) Date: Feb. 19, 2019

(87) PCT Pub. No.: WO2018/037036
PCT Pub. Date: Mar. 1, 2018

(65) Prior Publication Data
US 2019/0202176 A1   Jul. 4, 2019

(30) Foreign Application Priority Data

Aug. 24, 2016 (DE) .................... 10 2016 115 726.0

(51) Int. Cl.
*B32B 15/092* (2006.01)
*B32B 15/095* (2006.01)
(Continued)

(52) U.S. Cl.
CPC ............. *B32B 15/092* (2013.01); *B32B 3/00* (2013.01); *B32B 3/02* (2013.01); *B32B 3/08* (2013.01);
(Continued)

(58) Field of Classification Search
CPC ......... B32B 15/092; B32B 7/12; B32B 15/08; B32B 3/00; B32B 3/02; B32B 27/08;
(Continued)

(56) References Cited

U.S. PATENT DOCUMENTS 4,004,061 A    1/1977  Creighton et al.
6,706,378 B1 *  3/2004  Kakinoki ................... C09J 7/22
                                                   428/214
(Continued)

FOREIGN PATENT DOCUMENTS

DE    2 403 163    8/1974
DE    198 46 533   4/2000
(Continued)

OTHER PUBLICATIONS

International Seach Report dated Nov. 15, 2017 by the European Patent Office in International Application PCT/EP2017/071213.
(Continued)

*Primary Examiner* — David Sample
*Assistant Examiner* — Donald M Flores, Jr.
(74) *Attorney, Agent, or Firm* — Henry M. Feiereisen LLC

(57) ABSTRACT

A composite material includes a metallic bottom flat element, a metallic top flat element, and an intermediate layer made of a thermosetting synthetic material and arranged between the bottom flat element and the top flat element. The intermediate layer includes three or more duromers, with at least one of the duromers being in a cured state and the other ones of the duromers being in an uncured state. The at least (Continued)

one of the duromers has a polymerization temperature between 50 and 100° C., with a second one of the other ones of the duromers having a polymerization temperature between 170 and 220° C. and a third one of the other ones of the duromers having a polymerization temperature between 230 and 260° C.

5 Claims, 3 Drawing Sheets

(51) Int. Cl.
| | | |
|---|---|---|
| B32B 15/18 | (2006.01) | |
| B32B 27/38 | (2006.01) | |
| B32B 27/40 | (2006.01) | |
| B32B 3/08 | (2006.01) | |
| B32B 3/18 | (2006.01) | |
| B32B 7/14 | (2006.01) | |
| B32B 38/00 | (2006.01) | |
| B32B 15/08 | (2006.01) | |
| B32B 3/00 | (2006.01) | |
| B32B 3/02 | (2006.01) | |
| B32B 27/08 | (2006.01) | |
| B32B 38/18 | (2006.01) | |
| B32B 37/12 | (2006.01) | |
| B32B 7/12 | (2006.01) | |

(52) U.S. Cl.
CPC ............... *B32B 3/18* (2013.01); *B32B 7/12* (2013.01); *B32B 7/14* (2013.01); *B32B 15/08* (2013.01); *B32B 15/095* (2013.01); *B32B 15/18* (2013.01); *B32B 27/08* (2013.01); *B32B 27/38* (2013.01); *B32B 27/40* (2013.01); *B32B 37/12* (2013.01); *B32B 38/004* (2013.01); *B32B 38/1866* (2013.01); *B32B 37/1292* (2013.01); *B32B 2037/1253* (2013.01); *B32B 2038/0076* (2013.01); *B32B 2250/03* (2013.01); *B32B 2250/40* (2013.01); *B32B 2250/44* (2013.01); *B32B 2270/00* (2013.01); *B32B 2305/74* (2013.01); *B32B 2307/50* (2013.01); *B32B 2307/718* (2013.01); *B32B 2307/734* (2013.01); *B32B 2307/738* (2013.01); *B32B 2311/20* (2013.01); *B32B 2311/30* (2013.01); *B32B 2605/08* (2013.01); *Y10T 428/31678* (2015.04)

(58) Field of Classification Search
CPC ....... B32B 7/02; B32B 38/1866; B32B 37/12; B32B 38/004; B32B 7/14; B32B 15/095; B32B 15/18; B32B 27/38; B32B 27/40; B32B 3/08; B32B 3/18; B32B 2270/00; B32B 2307/718; B32B 2307/734; B32B 2307/50; B32B 2037/1253; B32B 37/1292; B32B 2311/20; B32B 2305/74; B32B 2311/30; B32B 2038/0076; B32B 2307/738; B32B 2250/03; B32B 2250/40; B32B 2250/44; B32B 2605/08; B32B 2305/076; Y10T 428/31678
USPC ....................................................... 156/314
See application file for complete search history.

(56) References Cited

U.S. PATENT DOCUMENTS

| | | | | |
|---|---|---|---|---|
| 2001/0025407 | A1* | 10/2001 | Hartmann ............... | B32B 15/08 29/469.5 |
| 2014/0212637 | A1* | 7/2014 | Syvret ...................... | B32B 7/12 428/201 |

FOREIGN PATENT DOCUMENTS

| | | |
|---|---|---|
| DE | 100 14 017 | 1/2002 |
| DE | 101 20 121 | 10/2002 |
| DE | 102014112788 | 3/2016 |
| EP | 1 136 253 | 9/2001 |
| GB | 2507188 A | 4/2014 |
| RU | 2291057 C1 | 1/2007 |
| WO | WO 02/024447 | 3/2002 |

OTHER PUBLICATIONS

Russian Search Report dated Dec. 17, 2019 by the Russian Patent Office in Russian Application No. 2019104297/05.
English translation of Russian Search Report dated Dec. 17, 2019 by the Russian Patent Office in Russian Application No. 2019104297/05.

* cited by examiner

COMPOSITE MATERIAL WITH IMPROVED SHAPING PROPERTIES AND METHOD FOR PRODUCING SUCH A COMPOSITE MATERIAL AND A SHAPED COMPONENT FROM IT

CROSS-REFERENCES TO RELATED APPLICATIONS

This application is the U.S. National Stage of International Application No. PCT/EP2017/071213, filed Aug. 23, 2017, which designated the United States and has been published as International Publication No. WO 2018/037036 and which claims the priority of German Patent Application, Serial No. 10 2016 115 726.0, filed Aug. 24, 2016, pursuant to 35 U.S.C. 119(a)-(d).

BACKGROUND OF THE INVENTION

The invention relates to a composite material comprising at least one metallic bottom flat element, a metallic top flat element and an intermediate layer, arranged between the bottom flat element and the top flat element, consisting of thermosetting synthetic material, in which a composite is produced by connecting the metallic flat elements with the intermediate layer. The flat elements can be in the form of sheet materials or strip materials, with all types of metal being possible, but steel is preferred. The top flat elements can also consist of synthetic material. Furthermore, the invention relates to a method for producing such a composite material and a method for producing a formed component therefrom.

In the automotive industry, many endeavors have been made to reduce the vehicle weights. Very different approaches are used for this. The current trend is for hybrid solutions, i.e. to combine different materials in order to achieve an optimum balance between costs, performance and weight reduction.

In order to meet these requirements, in the last few years weight-saving materials have been developed, such as e.g. multi-layered composite materials consisting of a composite consisting of flat elements made from steel and an intermediate layer made from synthetic material, which composite materials combine the properties of steel with a lower density. The top flat elements can also consist of synthetic material. These multi-layered composite materials are used e.g. in the production of body parts for motor vehicles or for exhaust systems. These composite materials are also referred to as composite sheets, sandwich sheets or lightweight sheets. Such composite materials are known e.g. from laid-open document DE 10 2014 112 788 A1.

Moreover, German patent document DE 100 14 017 C1 describes a method for producing a composite sheet, wherein an epoxy resin which only polymerises at relatively high temperatures is applied between two sheets preferably made from steel. In order nevertheless to fix the two sheets together, small spots are introduced into the epoxy layer, which spots consist of another epoxy resin which has a lower polymerisation temperature and which, after polymerisation, can still deform to a limited extent. The composite sheet fixed in this manner is formed into the formed component when the epoxy resin spots have already polymerised and the epoxy resin of the intermediate layer has not yet polymerised. After forming, the polymerisation of the epoxy resin of the intermediate layer is effected at elevated temperature which is optimally in the range of a paint baking temperature.

German laid-open document DE 101 20 121 A1 discloses a method for producing a composite sheet in which a reinforcing sheet is adhered to a base sheet. For this purpose, initially an adhesive having an elevated curing temperature is applied between the at least two sheets over the entire surface. In order to fix the two sheets, another adhesive having a lower curing temperature is applied to the peripheral edge of the sheets. This is used to seal the space with adhesive—which is applied over the entire surface and has not yet cured—and prevents leakage thereof during subsequent forming. For additional fixing, fixing spots consisting of the adhesive having a lower curing temperature can also be provided in the remaining region of the sheet. After forming is complete, the adhesive applied over the entire surface, which can be a hot melt, in particular an epoxy resin, a polyurethane resin or a plastisol, is completely cured, producing an optimum strength.

Other adhesives used to fix two sheets are known from German laid-open document DE 2 403 163.

Hereinafter, the term "composite material" is used for this group of products as a whole.

Composite materials are characterised by a low weight in conjunction with a high buckling strength. In order to achieve this, the material consists of flat elements which are as thin as possible, in particular of sheets preferably made from steel, in a particularly preferred manner with a thickness of 0.2 to 2.0 mm and an intermediate core layer made from synthetic material having a thickness of preferably 0.2 to 2 mm. The top flat elements can be metallic, e.g. consisting of steel, and can also consist of synthetic material.

However, the positive properties of composite materials are contrasted with disadvantages when producing the composite material and during further processing by forming to make a component. It is known from the prior art that thermoplastic as well as thermosetting synthetic materials are used for composite materials as the intermediate layer.

Thermoplastic and thermosetting synthetic materials can basically be differentiated as follows:

Thermoplastics, also called plastomers, are synthetic materials which can (thermoplastically) deform in a particular temperature range. This process is reversible, i.e. it can be repeated as often as desired by cooling and re-heating back into the molten state so long as the so-called thermal decomposition (pyrolysis) of the material does not commence as a result of over-heating. This is the difference between thermoplastics and thermosetting plastics. In addition, thermoplastics are made up of carbon chains with few branches or of unbranched, i.e. linear, carbon chains which are connected together only by weak physical bonds.

In contrast, thermosetting plastics, also called duromers, are synthetic materials which can no longer be deformed after curing. Thermosetting plastics are hard, glass-like polymer materials which are firmly cross-linked in three dimensions via chemical primary valency bonds. Cross-linking occurs when mixing pre-products with branching points and is activated either chemically at room temperature using catalysts or thermally at high temperatures.

Binding thermoplastics to metallic flat elements can typically be achieved only via adhesion promoters because unmodified thermoplastics have no reactive terminal groups which are suitable for chemically bonding to a metallic surface.

Applying adhesion promoters is expensive and the modification of the thermoplastics likewise requires other working steps and is costly.

Binding the thermoplastic polymer to the metallic matrix as a result of both measures is also clearly worse compared with the binding of duromers (e.g. adhesives on an epoxy, polyurethane basis) to metals.

The cured thermosetting polymers alternatively used for composite materials (e.g. epoxides or polyurethanes) are considerably stiffer than thermoplastics owing to the cross-linking and thus permit high strengths of the formed component, but they are also much more brittle in the event of tensile or bending stresses.

Therefore, composite materials having a thermosetting, cured intermediate layer cannot readily be formed into a component as can thermoplastics, but rather the intermediate layer has a distinct tendency towards brittle fracture. In most cured duromers, it is not possible to repair these systems by re-heating, as is possible e.g. in the case of thermoplastics.

For the production of a formed component, it would be possible to produce a composite material having an only partially cured thermosetting intermediate layer which has improved formability owing to the still low amount of cross-linking, but there is the risk that the uncured duromer is pressed out of the composite material and thus the forming tool becomes contaminated.

In addition, it is possible that the two top layers contact one another owing to the displacement of the uncured duromer and therefore properties of the composite material become lost (e.g. stiffness, vibration damping, heat insulation, minimum material thickness, visual appearance of the component, etc.).

The targeted stopping of the polymerisation reaction for partial curing of the duromer is also very difficult to achieve during the production of the composite material, which considerably adversely affects the process reliability. Moreover, the properties of the component produced from the composite material by forming are greatly dependent thereon.

It is also disadvantageous that the reactivity of a partially cured duromer additionally decreases as the storage time increases or this can only be sufficiently achieved at very low temperatures for a limited period of time, which means that the production and logistical outlay for producing the component would be considerably increased.

Moreover, generally known to provide sheets with local reinforcement.

It is thus the object of the invention to provide a composite material having an intermediate layer consisting of thermosetting synthetic material which has improved forming properties and can also be produced in a cost-effective and process-reliable manner. In addition, a method for producing such a composite material and a method for producing a component from a composite material are to be provided.

SUMMARY OF THE INVENTION

According to one aspect of the present invention, the indicated object is achieved by a composite material including a metallic bottom flat element, a top flat element and an intermediate layer of thermosetting synthetic material, arranged between the bottom flat element and the top flat element, wherein the intermediate layer includes three or more duromers, wherein at least one duromer is in the cured state and the other duromers are in a not-yet-cured state and the first duromer has a polymerisation temperature between 50 and 100° C., the second duromer has a polymerisation temperature between 170 and 220° C. and a third duromer has a polymerisation temperature between 230 and 260° C.

In conjunction with the invention, the terms bottom flat element and top flat element are to be understood to mean a sheet, a panel or a section of a strip which can be produced from metal, in particular steel, and also synthetic material.

Provision is advantageously made that, as seen in plan view, the bottom flat element and the top flat element have the same outer dimensions and are flush with each other. This composite material is then thus present as a strip material or panel section.

According to another aspect of the present invention, the indicated object is achieved by a composite material including a metallic bottom flat element, a top flat element and an intermediate layer of thermosetting synthetic material, arranged between the bottom flat element and the top flat element, wherein the top flat element, as seen in plan view, covers only a part of the bottom flat element and thus not the entire bottom flat element. In this context, part of a bottom flat element is understood to mean a surface proportion of less than 90%, preferably less than 50% of the bottom flat element.

In this embodiment, the top flat element, which is used for local reinforcement and is also referred to as a patch, is made of synthetic material or metal. Depending upon the usage requirements, the positive properties such as lightness of the synthetic material or strength of the metal can thus be used in a targeted manner.

As in the case of the patch, in an advantageous manner the intermediate layer is also comprised of three or more duromers, wherein at least one duromer is in the cured state and the other duromers are in an uncured state.

Provision is preferably made, like in the conventional composite sheet with the bottom flat elements and the top flat elements having identical dimensions, that the first duromer has a polymerization temperature between 50 and 100° C., the second duromer has a polymerization temperature between 170 and 220° C. and a third duromer has a polymerization temperature between 230 and 260° C.

Provision is advantageously made in the patch that the top flat element made of synthetic material or of metal, in particular steel.

The concept of the invention resides in the fact that the start of the polymerization of the duromers is controlled e.g. thermally by different polymerization temperatures or chemically by e.g. catalytic polymerization or another polymerization mechanism so that the polymerization of the respective duromers can be started in a targeted manner at different points in time in the production of the composite material or the production of the component.

Polymerisations, also referred to as polyreactions, are divided mainly into two different groups:

The first group are the chain polymerizations. In this process, the monomers react with each other to form dimers, trimers, oligomers and finally polymers. The chain polymerization reactions are typically divided into radical, anionic and cationic polymerization. It is typical that when building the polymer chains, monomers react with the growing chains and by-products, such as e.g. water molecules, are not released hereby. In most cases, the monomers react non-specifically with growing polymer chains of the most varied lengths and so a multiplicity of chain lengths are often formed during the reaction.

The second group of polymerization reactions are the step-growth reactions. In this process, monomers react with molecules, such as e.g. water, being released. Furthermore, the reaction typically takes place in stages. This means that at the beginning, mostly only relatively short chains, dimers, trimers up to oligomers are formed from the monomers. Only when the conversion to these intermediate stages is almost fully complete do these react, as the next stage, with each other to form polymers. Polyadditions and polycondensations are representative of step-growth reactions.

According to still another aspect of the present invention, a method for producing a composite material in the form of a strip or panel applying an intermediate layer of a thermosetting synthetic material onto a metallic bottom flat element, and a top flat element is placed on the intermediate layer and an integrally bonded composite is produced between the bottom flat element and the top flat element and the intermediate layer under the influence of force and/or temperature, characterised in that an intermediate layer comprised of three or more duromers having different polymerisation temperatures is applied, wherein only the first duromer undergoes curing during the production of the composite material.

In accordance with the invention, the different duromers can be applied to the bottom flat element as a film/prepreg or by extrusion both as a mixture with the same or different mixing ratio of the different duromers and also arranged separately.

According to yet another aspect of the present invention, in a method for producing a component from a composite material the composite material is formed into a component and the component is then subjected to a heat treatment, wherein at least one second duromer, which up to now has not yet cured, is cured under the influence of temperature.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
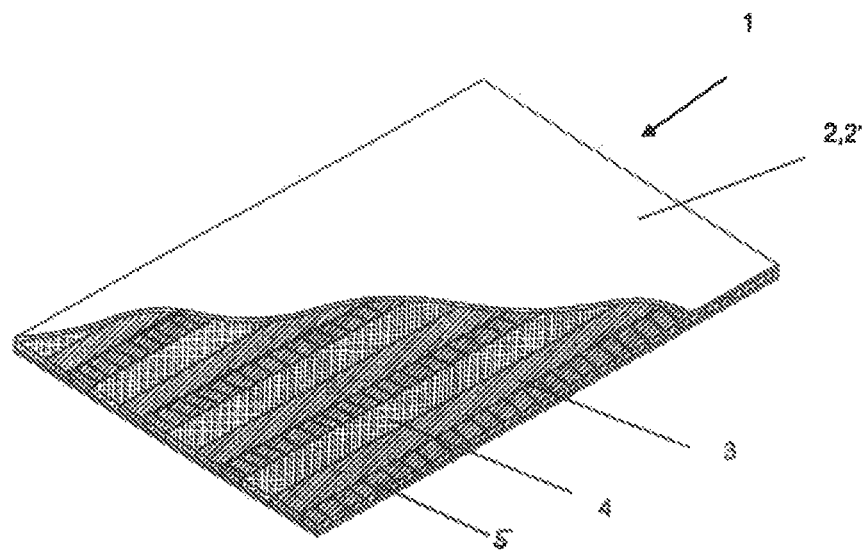
FIGS. 1 to 3 schematically illustrate by way of example different arrangements of the duromers as the intermediate layer of a composite material, FIG. 4 schematically illustrates by way of example a side view of the composite material 1, with a top flat element acting a locally reinforcing patch and covering only a part of a bottom flat element.
Figure 2:
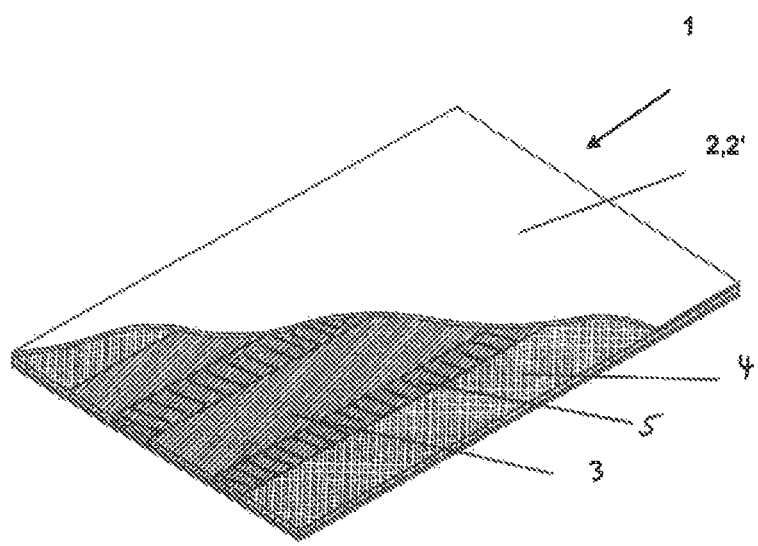
Figure 3:
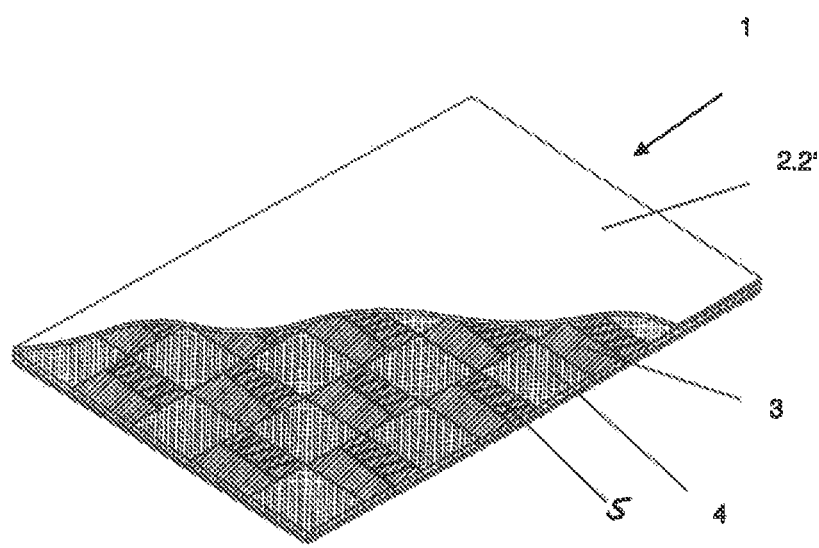
Figure 4:
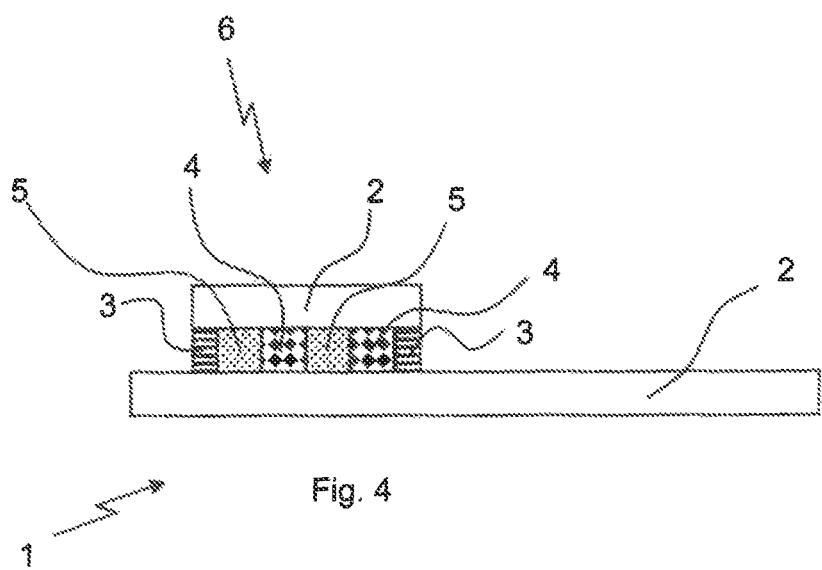

FIGS. 1 to 3 schematically illustrate by way of example different arrangements of the duromers as the intermediate layer of a composite material. FIG. 4 schematically illustrates by way of example a side view of the composite material 1, wherein the top flat element 2' acts as a locally reinforcing patch 6 and covers only a part of the bottom flat element 2.

FIGS. 1 to 3 each show a composite material 1 having metallic bottom flat elements 2 and top flat elements 2', in particular sheets, and an intermediate layer comprised of the duromers 3, 4 and 5 having different polymerization temperatures. The bottom flat elements 2 and the top flat elements 2' each have the same outer dimensions and are flush with each other, as seen in plan view. FIGS. 1 and 2 illustrate different strip-shaped arrangements of the duromers 3, 4 and 5, whereas FIG. 3 shows a chessboard-like arrangement of the duromers 3, 4 and 5. Depending upon the requirements for the intermediate layer during forming, the most varied arrangements can thus be formed.

FIG. 4 shows a composite material 1 as a locally reinforced bottom flat element 2 with a metallic bottom flat element 2, a top flat element 2' which can be made of synthetic material or metal and has outer dimensions which are smaller than the bottom flat element 2. In particular, the top flat element 2' covers only a part of the bottom flat element 2 as seen in plan view or as illustrated in side view. The outer dimensions of the top flat element 2 are thus smaller than those of the bottom flat element 2. An intermediate layer of thermosetting synthetic material is arranged between the bottom flat element 2 and the top flat element 2'. This intermediate layer can be made of only one thermosetting synthetic material or, as illustrated, of three and more thermosetting plastics 3, 4, 5. The arrangement comprised of intermediate layer and top flat element 2' is used as local reinforcement and is referred to as patch 6.

More than one patch 6 can of course be arranged next to each other on a bottom flat element 2 depending upon the reinforcement requirements.

The invention will be described hereinafter using the example of duromers which have different polymerization temperatures.

The composite material is made e.g. of two galvanized steel sheets, between which there is a polymer core as an intermediate layer comprised of three or more duromers having different polymerization temperatures.

When producing the composite material 1, the first duromer 3 cures at relatively low temperatures (e.g. 50-100° C.) whilst the polymerization of the duromers 4 and 5 does not yet commence at this temperature or is only very slight.

Owing to the curing of duromer 3, the distance between the two flat elements 2, 2' in the composite material 1 is defined such that a semi-finished product is produced, in which duromer 4 of the intermediate layer completely cures only after forming into a component under the influence of temperature at e.g. 170 to 200° C. as in the case of cathodic dip coating.

This semi-finished product can thus be further processed, similar to a monolytic sheet, to form the component by forming. The duromer 3, which is already cured in the semi-finished product, ensures that the distance between the two flat elements 2, 2' is maintained, even during forming into a component. By suitably applying duromer 3, e.g. in the edge regions of the composite material 1, and duromer 4 in the inner surface region, duromer 4 is not pressed out of the intermediate space and thus cannot contaminate the forming tool. Subsequent to the forming step, duromer 4 is cured in a further heat-treatment step under the influence of temperature and the required component properties are thus achieved.

When producing the composite material 1, the distance between the two flat elements 2, 2' can be advantageously set via the design, in accordance with the invention, of the composite material 1 such that contacting of the two flat elements 2, 2' owing to high forming forces does not occur, or only occurs in previously defined regions. The loss of properties such as vibration damping, heat insulation, stiffness, etc. is thus prevented.

In the design, in accordance with the invention, of the composite material 1, the intermediate layer of the composite material additionally has a further proportion of a third duromer having an even higher polymerization temperature. Should the component become damaged during use (e.g. delamination between flat elements 2, 2' and duromer core 3, 4), the polymerization of the third duromer is then advantageously used for repairing the component and the required component properties are thus reproduced. The connection between the bottom flat element 2 and top flat element 2' is thus re-established after a possible delamination of the bottom flat element 2 and/or top flat element 2' from the duromers 3, 4, 5.

During further processing of the composite material 1 to form a component, it is advantageous if the difference in the polymerization temperatures of the respective duromers 3, 4, 5 is at least 10° C. A difference of at least 40° C. has proved to be particularly advantageous.

Epoxides, polyurethanes or other thermosetting plastics can be used for example as duromers 3, 4, 5 for the composite material 1 in accordance with the invention and permit considerably better bonding to the metallic top layers than is possible with unmodified thermoplastics.

The composite material in accordance with the invention can thus be formed without any problems and without any tool contamination, wherein the required component properties can be achieved in a process-reliable manner.

Owing to the thermosetting polymer core, the resulting component has a considerably higher stiffness than would be achieved with a comparable thermoplastic, with the same thickness.

Against the background that a single, partially cured duromer is not used for producing the composite material but instead three or more duromers are used, of which at least one is uncured and the others are cured, the properties of the composite material in accordance with the invention and of the component produced by forming can additionally be set in a considerably more precise manner which has a positive effect on the process reliability during production. In addition, the reactivity of the polymeric core layer is considerably higher owing to the fact that partial curing has not occurred.

Epoxides, polyurethanes or other suitable duromers can be used as the duromers. Consequently, in accordance with the invention the same or different duromers having different polymerization start conditions can be used for the intermediate layer, said conditions differing e.g. in terms of the polymerization temperature.

The basic requirement is that the duromers effectively bind to the metallic bottom flat elements and/or top flat elements made from metal or synthetic material, and the polymerization temperatures thereof are sufficiently far apart. Three or more duromers are used, the polymerization thereof being triggered in different manners (e.g. thermal polymerization versus catalytic polymerization).

The disadvantages when producing a component in accordance with the prior art can thus be overcome in a simple manner using this innovative composite material and the production method in accordance with the invention.

What is claimed is:

1. A composite material, comprising:
   a metallic bottom flat element;
   a metallic top flat element; and
   an intermediate layer made of a thermosetting synthetic material and arranged between the bottom flat element and the top flat element, said thermosetting synthetic material comprises three or more duromers, with at least one of the duromers being in a cured state and the other ones of the duromers being in an uncured state, said at least one of the duromers having a polymerization temperature between 50 and 100° C., with a second one of the other ones of the duromers having a polymerization temperature between 170 and 220° C. and a third one of the other ones of the duromers having a polymerization temperature between 230 and 260° C.

2. The composite material of claim 1, wherein, as seen in plan view, the bottom flat element and the top flat element have same outer dimensions and are flush with each other.

3. The composite material of claim 1, wherein the three or more duromers include polymers of a same element group or polymers of different element groups of different polymerization temperatures.

4. The composite material of claim 3, wherein the same element group includes polyurethanes or epoxides.

5. The composite material of claim 1, wherein the duromers have different polymerization temperatures or polymerize using different polymerization mechanisms.

* * * * *